United States Patent [19]
McCord

[11] Patent Number: 5,830,309
[45] Date of Patent: Nov. 3, 1998

[54] RESIN-BASED FRICTION MATERIAL

[75] Inventor: H. Lee McCord, Longview, Tex.

[73] Assignee: Stemco Inc, Longview, Tex.

[21] Appl. No.: 501,494

[22] Filed: Jul. 12, 1995

[51] Int. Cl.$^6$ .................................................. B28B 1/26
[52] U.S. Cl. .......................................... 156/307.7; 264/86
[58] Field of Search ................................ 264/86, 87, 175, 264/177.1, 177.17, 232, 234, 236; 156/89, 307.7

[56] References Cited

U.S. PATENT DOCUMENTS

| | | | |
|---|---|---|---|
| 4,320,823 | 3/1982 | Covaleski | 197/107 |
| 4,563,386 | 1/1986 | Schwartz | 428/283 |
| 4,743,635 | 5/1988 | Nakagawa et al. | 523/155 |
| 4,861,809 | 8/1989 | Ogawa et al. | 523/149 |
| 4,866,107 | 9/1989 | Doxsee et al. | 523/153 |
| 5,004,497 | 4/1991 | Shibata et al. | 75/229 |
| 5,132,065 | 7/1992 | Christie | 264/122 |
| 5,230,952 | 7/1993 | McCord | 428/297 |
| 5,273,558 | 12/1993 | Nelson | 51/298 |
| 5,417,726 | 5/1995 | Stout et al. | 51/293 |
| 5,478,642 | 12/1995 | McCord | 428/297 |
| 5,520,866 | 5/1996 | Kaminski et al. | 264/112 |

Primary Examiner—Donald E. Czaja
Assistant Examiner—Jacqueline A. Ruller
Attorney, Agent, or Firm—Cummings & Lockwood

[57] ABSTRACT

A friction material and process of forming a friction material embodies a slurry of aramid, acrylic and carbon fibers, together with kaolin clay and aluminum oxide used as fillers in a phenolic resin binder. The matrix formed by the fibers entraps a relatively large quantity of carbon particles. The carbon particles comprise more than forty or fifty percent of the weight of the material. During the process of formation, the slurry is de-watered to reduce moisture content to the order of two percent before the resin binder is cured under heat and pressure.

16 Claims, 1 Drawing Sheet

RESIN-BASED FRICTION MATERIAL

BACKGROUND OF THE INVENTION

This invention relates generally to friction materials of the type used on clutch facings and the like, and relates more particularly to friction materials characterized by a highly stable coefficient of friction throughout a wide range of energy transmission levels, and to a method of manufacturing such a material.

SUMMARY OF THE INVENTION

The material of the present invention is particularly adapted to applications such as the friction facing of a speed synchronizing ring in a vehicle power train transmission assembly. Synchronizer rings are included in the portion of the transmission assembly that serves to synchronize the speed of a driven gear with the speed of the vehicle drive shaft, before the two are coupled together for the purpose of transmitting motive power from the gear to the shaft.

One type of synchronizer, commonly known as a Warner ring, includes a radially projecting spline on the outer diameter surface thereof and a conical inner diameter surface which is intended to engage in frictional relationship, a mating conical surface on a drive gear. In a form of synchronizer ring known as a "pin" type, the spline projects radially inwardly, and the conical mating friction surface is formed on the outer peripheral surface of the ring.

In the prior art, high strength brass has been used as the structural material for both the synchronizer ring body and the friction surface. However, the energy absorption and friction capacity of materials such as high strength brass have been found to be unacceptable for friction surfaces in applications which require the transmission of high levels of power through the friction face. Further, the cost of brass as a structural material is considered to be generally too high for most commercial applications. Steel, in various forms, also has been used as a structural material for synchronizer rings, in combination with a variety of well-known friction materials. Some of the various forms of steel, which have been, and continue to be, considered acceptable for the structural portion of synchronizer rings, include sintered, forged and cast. Some of the friction materials that has been used previously, including paper, fluorocarbon, carbon based and molybdenum, have been found to be inadequate in certain aspects.

Paper-based friction materials are subject to significant limitations. A most important limitation relates to the customary inclusion of cellulose fibers, which tend to char and/or burn readily at the temperatures frequently encountered in the operation of frictional-engagement devices. As a direct result of this charring and burning characteristic, the coefficient of friction of paper-based friction materials tends to decline dramatically under heavy-use conditions. Any decline in the coefficient of friction of a friction material in a transmission-like device can have an undesirable adverse effect on the overall performance of the device. In certain instances, decline of the coefficient of friction can render the device entirely inoperative, with consequent serious if not catastrophic consequences.

The Assignee of this patent application has, for many years, manufactured and sold fluorocarbon-based friction materials, including the material disclosed in U.S. Pat. No. 5,230,592, for use in synchronizer rings and the like. Fluorocarbon-based friction materials perform well for their intended purpose, but they are known to function within a limited unit-force load range only; further, they are characterized by a coefficient of friction which declines with increasing unit force load rank. These limitations generally have restricted the use of fluorocarbon-based friction materials to relatively low unit force load synchronizers and other power-transmission type devices.

Carbon-based friction materials, similarly are known to be acceptable for certain applications. Forms of such materials are disclosed in U.S. Pat. Nos. 4,700,393, 4,639,392 and 5,083,650. However, the use of carbon-based materials is subject to a significant drawback in that it is relatively expensive and difficult to manufacture. Sprayed molybdenum coatings have been used as friction materials, also. However, the molybdenum has been found to have an energy limit above which it does not function effectively in such applications. Further, it is very expensive to manufacture. Environmental concerns imposed further limits on the use of molybdenum.

Accordingly, it is an object of this invention to provide an effective friction material that maintains a substantially constant coefficient of friction throughout a wide range of operating temperatures and unit force loads.

Another and further object of this invention is the provision of a friction material that can be used satisfactorily in relatively large-scale and high-powered power transmission assemblies.

Another object of this invention is the provision of an effective friction material that can absorb a substantial amount of frictional energy while maintaining a substantially constant coefficient of friction.

Still another object of this invention is the provision of a friction material that is not subject to significant charring or burning throughout its range of operating temperatures.

And still another object of this invention is the provision of a simple and inexpensive method of manufacturing an effective friction material that meets the objects stated above.

BRIEF DESCRIPTION OF THE DRAWINGS

These, and other and further objects, features and advantages of this invention will be made apparent to those having skill in this art by the disclosure set forth in the following specification, when considered with reference to the accompanying drawings, in which.

DETAILED DESCRIPTION OF THE INVENTION

Figure 1:
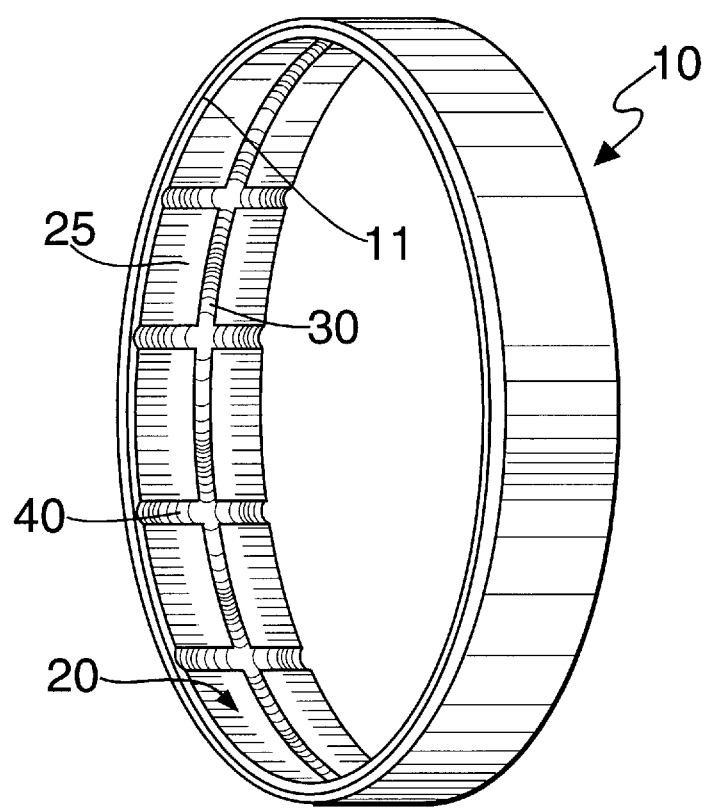
FIG. 1 is a pictorial representation of a synchronizer ring having a friction material in accordance with this invention bonded to its surface.

In use, a friction material comprising the components of the invention described herein, is pre-formed in a desired shape, and pressed into contact with the appropriate surface of a substrate such as a synchronizer ring 10 of FIG. 1. The pre-form may then be cured and bonded to the substrate in a single step, under heat and pressure, as further described herein. It should be recognized, however, that the friction material of this invention may be cured into final form and shape independently of any substrate; a friction member thus formed may be bonded to a desired support surface or substrate at a later time, using known bonding techniques.

In FIG. 1, pre-formed friction element 20 is applied to the inner surface 11 of ring 10. The element routinely includes one or more axial grooves 40 and annular grooves 30 which are intended to interact with other elements of synchronizer assemblies (not shown), but which form no part of this invention. These axial and annular grooves are routinely formed in the friction surface 25 in operations that are secondary to the curing and bonding sequence. The inner surface 25 of friction element 20 represents the operative portion of a synchronizer ring formed in accordance with this invention.

The material of the present invention comprises, generally, a homogeneous mixture of aramid fibers, acrylic fibers and carbon fibers, bound together by a phenolic resin binder using finely ground aluminum oxide and finely ground kaolin clay as filler materials. The aramid and acrylic materials are first mixed with a high volume of water to form a slurry. Aramid fiber in pulp form, commercially available under the trademark KEVLAR, and having of finite length in the range of 4–5 millimeters, is a preferred form of aramid fiber for this invention. A preferred form of acrylic fiber, also commercially available, is a wet fibrillated fiber based on polymers and copolymers of acrylonitrile.

After the aramid/acrylic slurry mixture is formed, carbon fibers are added to it. Carbonized pan-based carbon fibers, milled to approximately 0.5 mm to 1.5 mm in length represent a preferred form of carbon fiber for the purposes of this invention. It is known that carbon fibers, in general, do not mix readily or well with other fibers in a slurry. It has been discovered that, for the purposes of this invention, homogeneous mixing of the carbon fibers with the other fibers in the slurry is facilitated by pre-treating the slurry with a nonionic surfactant.

Prior to shaping of the fiber/binder mixture into its final, or ready-to-finish form, the various components of the mixture will have approximately the following percentage-by-weight relationships relative to the overall weight of the mixture:

| COMPONENT | RANGE OF % BY WEIGHT |
|---|---|
| Acrylic Fiber | 1–2 |
| Aramid Fiber | 2–4 |
| Carbon Fiber | 4–6 |
| Aluminum Oxide | 16–20 |
| Kaolin Clay | 8–12 |
| Carbon Particles | 40–50 |
| Phenolic Resin | Remainder |

Aluminum oxide and kaolin clay in powdered form, having particle diameters not substantially greater than 0.33 mm are added to the fibrous mixture as filers in the percentage ratios indicated above, to further enhance the friction properties of the material of this invention. It has been discovered that the inclusion of these two materials maximizes the coefficient of friction of the resultant friction material.

In addition to carbon fibers having the characteristics previously described herein, carbon must be added to the slurry mixture in the form of calcinated coke having particle diameters in the range of 0.18 mm to 0.12 mm. It has been discovered as part of this invention that the inclusion of carbon particles of this type, in the relatively high proportion range of 40 to 50% not only increases char and burn resistance and provides high friction, high energy absorption characteristics, but it also significantly increases porosity of the resultant material. Porosity is desirable in a friction material of this type for reasons explained below.

Elemental carbon in general and carbon particles in particular are known in the art to provide desirable frictional characteristics, good burn resistance, high energy capacity, and a satisfactory coefficient of friction value. The use of carbon particles and fibers in friction material is the subject of many prior patents. Incorporation of carbon particles into a reasonable matrix for use as a friction surface is difficult to achieve. The entrapment of a high percentage (forty to fifty percent) of carbon particles in a fibrous matrix of aramid and acrylic fibers is unique among friction materials and previously was not thought to be feasible. The entrapment in a fibrous matrix of the high percentages of carbon particles herein disclosed provides a superior friction surface over the prior art; the desirable frictional characteristics of carbon are utilized; the fiber matrix supplies a generally pliant and somewhat flexible base such that the carbon particles can conform effectively to the frictional mating surface; the size of the carbon particles has been selected to optimize the porosity of the friction material. Porosity is a desirable feature because it provides a location for retention of the oil film material while the oil remains close to the mating friction surfaces for cooling and lubrication.

The fiber slurry with all fillers and particles included should be power-mixed, preferably for at least sixty (60) seconds prior to de-watering in either a batch mix operation or in a continuous operation such as a Fourdrinier paper making machine.

The balance of the mix comprises heat curable phenolic resin powder which will bind the fiber, particles, and fillers together into a coherent unified structure under heat and pressure.

Following addition of all materials and final power-mixing, the composite is distributed in conventional manner on a sheet mold or wire-form paper-making machine for de-watering. The de-watering process preferably reduces the moisture content of the composite to less than approximately two percent (2%).

After de-watering, the remaining sheet or roll is pressed on a heat roll at a pressure of approximately 300 to 1,000 psi and a roll temperature of approximately 100 to 150 degrees Fahrenheit.

The following specific example represents an illustrative and desirable form of the invention:

A sample was made with the following actual percentages of ingredients:

| Aramid fiber | 3.1% |
|---|---|
| Acrylic fiber | 1.7% |
| Carbon fiber | 5.2% |
| Carbon particles | 45.3% |
| Aluminum oxide | 18.0% |
| Clay | 9.3% |
| Phenolic resin | 17.4% |

The mixture was formed into a sheet at a pressure of 500 psi and at a temperature of 125 degrees Fahrenheit and then bonded and cured into a 95 mm synchronizer ring with a 6.5 degree cone angle. Testing on an inertia dynamometer has shown the coefficient of friction to be better than prior art, bronze and moly coated synchronizers.

Although a preferred embodiment of this invention has been described, it will be evident to those having skill in this art that other and further embodiments of this invention may be employed within the scope of the following claims:

I claim:

1. A process for forming a friction material comprising the steps of:

(a) mixing aramid and acrylic fibers in a water slurry, (b) adding carbon fibers and a surfactant to the water slurry, (c) adding carbon particles and other filler particles and a phenolic resin solution to the fiber slurry mix and mixing further, (d) de-watering the slurry so as to form a moist sheet of material, (e) drying said moist sheet of material to substantially remove the remaining water and form a dried sheet of material, (f) pressing said dried sheet of material in a warm press, and (g) curing said sheet of material under heat and pressure.

2. A process for forming a friction material in accordance with claim 1 wherein the quantities of said aramid and said acrylic fibers are selected such that said aramid fibers represent between two percent and four percent of the final weight of said sheet of material and the acrylic fibers represent between one percent and two percent of the total weight of said sheet of material.

3. A process for forming a friction material in accordance with claim 1 wherein the quantity of said carbon fibers is selected such that said carbon fibers represent between four percent and five percent of the final weight of said sheet of material.

4. A process for forming a friction material in accordance with claim 1 wherein the quantity of said carbon particles is selected such that said carbon particles represent between forty percent and fifty percent of the final weight of said sheet of material.

5. A process for forming a friction material in accordance with claim 1 wherein said carbon particles are characterized by particle diameters in the range of 0.12 mm to 0.18 mm.

6. A process for forming a friction material in accordance with claim 1 wherein the length of said carbon fibers is in the range of 0.5 mm to 1.5 mm.

7. A process for forming a friction material in accordance with claim 1 wherein the surfactant is an octylphenol ethoxylate.

8. A process for forming a friction member comprising the steps of:

(a) mixing aramid and acrylic fibers in a water slurry, (b) adding carbon fibers and a surfactant to the water slurry, (c) adding carbon particles and other filler particles and a phenolic resin to the fiber slurry mix and mixing further, (d) de-watering the slurry so as to form a moist sheet of material, (e) drying said moist sheet of material to substantially remove the remaining water and form a dried sheet of material, (f) pressing said dried sheet of material in a warm press, (g) applying a portion of said sheet of material to a substrate member, (h) curing said sheet of material under heat and pressure while simultaneously bonding said sheet of material to said substrate and, (i) machining said sheet of material to final size.

9. A process for forming a friction member in accordance with claim 8 wherein the quantities of said aramid and said acrylic fibers are selected such that said aramid fibers represent between two percent and four percent of the final weight of said sheet of material and the acrylic fibers represent between one percent and two percent of the total weight of the final sheet of material.

10. A process for forming a friction member in accordance with claim 8 wherein the quantity of said carbon fibers is selected such that said carbon fibers represent between four percent and five percent of the final weight of said sheet of material.

11. A process for forming a friction member in accordance with claim 8 wherein the quantity of said carbon particles is selected such that said carbon particles represent between forty percent and fifty percent of the final weight of said sheet of material.

12. A process for forming a friction member in accordance with claim 8 wherein said carbon particles are characterized by particle diameters in the range of 0.12 mm to 0.18 mm.

13. A process for forming a friction member in accordance with claim 8 wherein the length of said carbon fibers is in the range of 0.5 mm to 1.5 mm.

14. A process for forming a friction member in accordance with claim 8 wherein the surfactant is an octylphenol ethoxylate.

15. A process for forming a friction member in accordance with claim 8 wherein said drying step reduces the moisture content of said friction member to a value generally zero percent to four percent.

16. A process for forming a friction member in accordance with claim 8 wherein said curing step is performed at a temperature within the range of 320 degrees Fahrenheit and 400 degrees Fahrenheit and at a unit pressure within the range of 500 psi to 1,500 psi.

* * * * *